Figure 1:
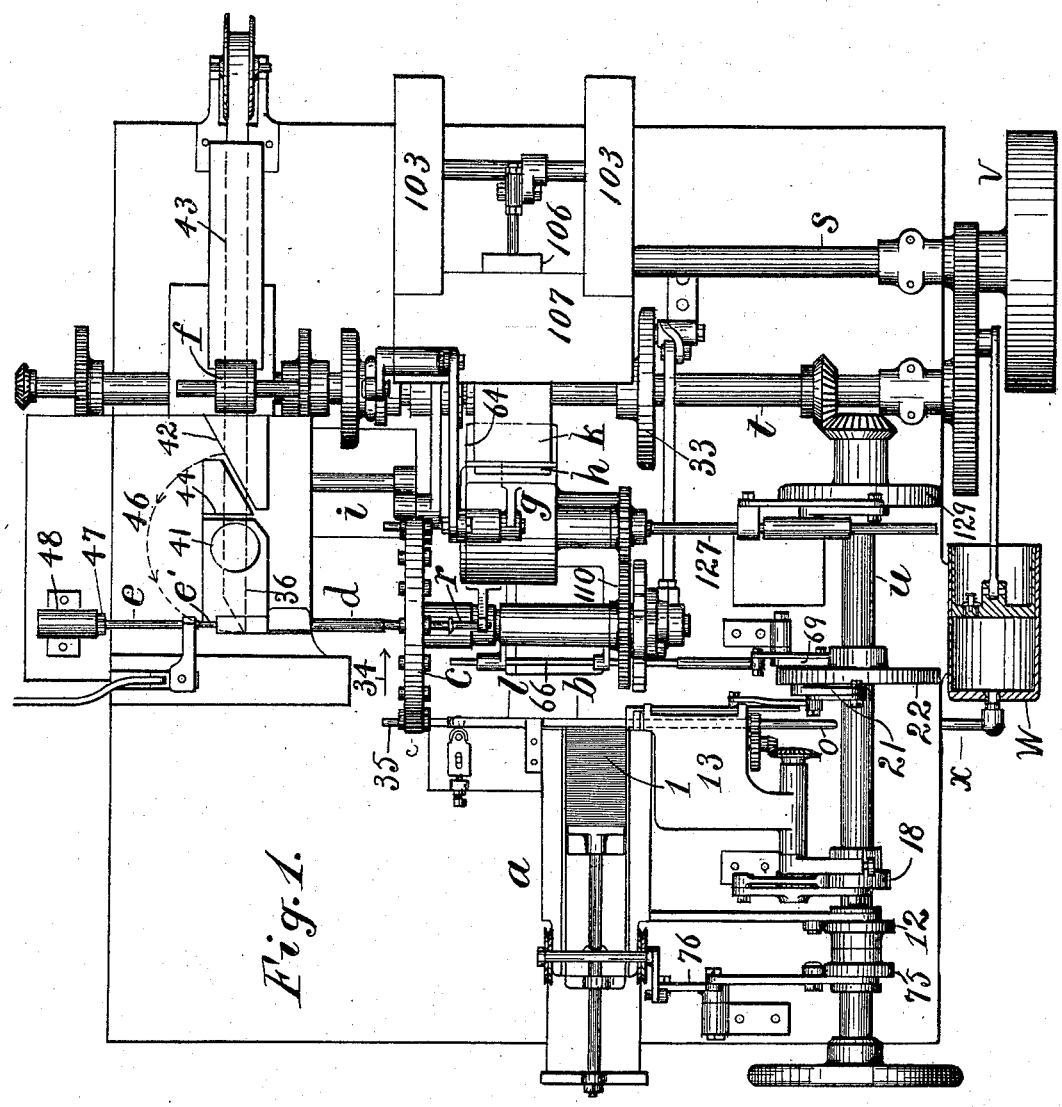

No. 705,591. Patented July 29, 1902.
F. J. LUDINGTON.
MACHINE FOR MAKING INDIVIDUAL CIGARETTES.
Application filed Aug. 31, 1901.
(No Model.) 9 Sheets—Sheet 1.

Attest:
L. Lee.
Walter H. Talmage.

Inventor.
Frank J. Ludington, per
Thomas S. Crane, Atty.

No. 705,591. Patented July 29, 1902.
F. J. LUDINGTON.
MACHINE FOR MAKING INDIVIDUAL CIGARETTES.
(Application filed Aug. 31, 1901.)
(No Model.) 9 Sheets—Sheet 2.
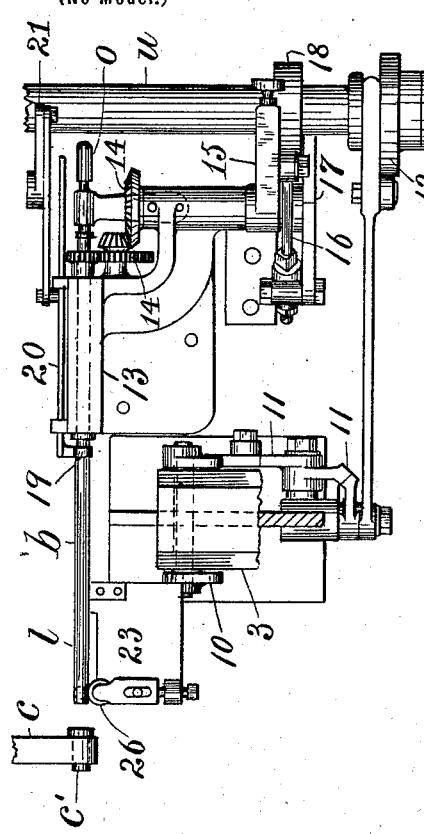
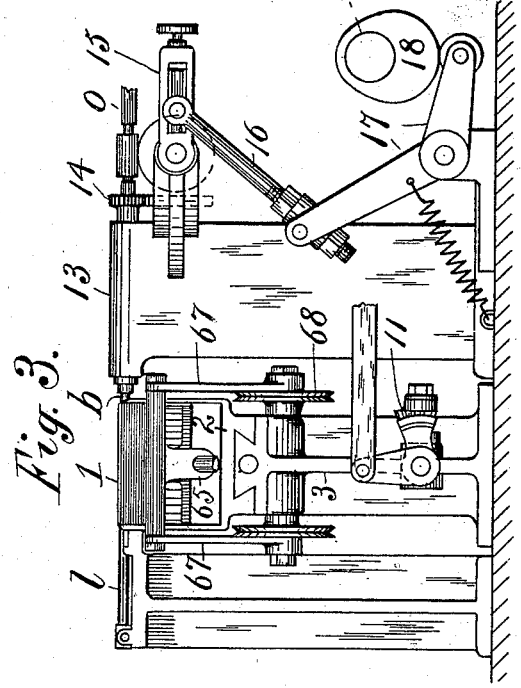
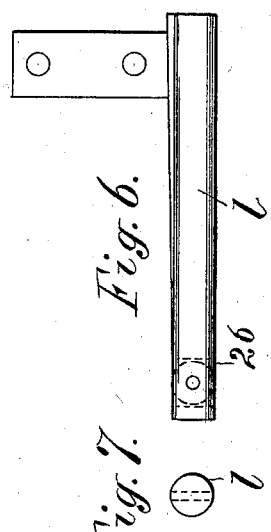
Attest:
L. Lee.
Walter H. Talmage.
Inventor.
Frank J. Ludington, per
Thomas S. Crane, Atty.

No. 705,591. Patented July 29, 1902.
F. J. LUDINGTON.
MACHINE FOR MAKING INDIVIDUAL CIGARETTES.
(Application filed Aug. 31, 1901.)
(No Model.) 9 Sheets—Sheet 3.
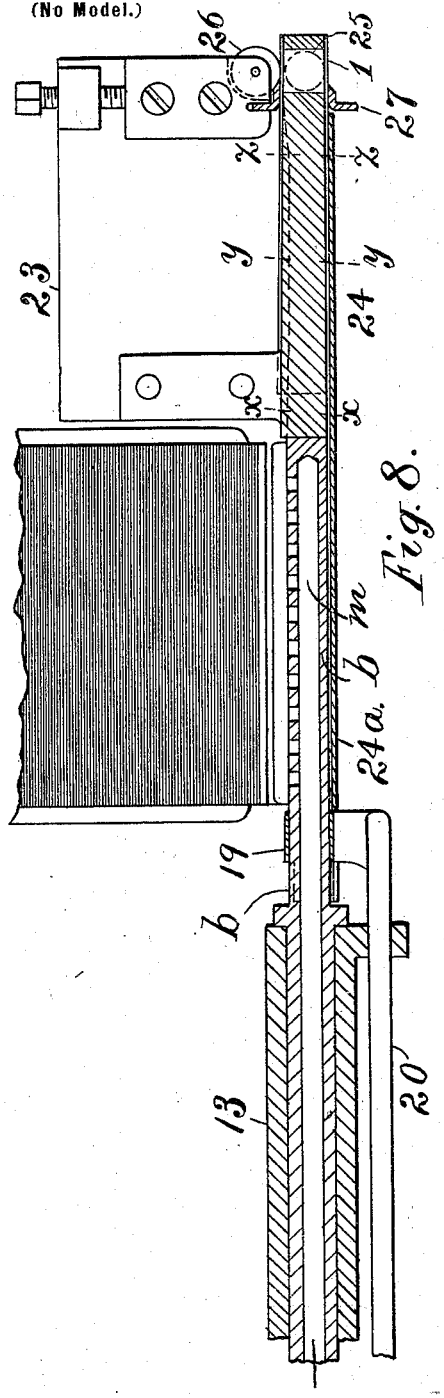
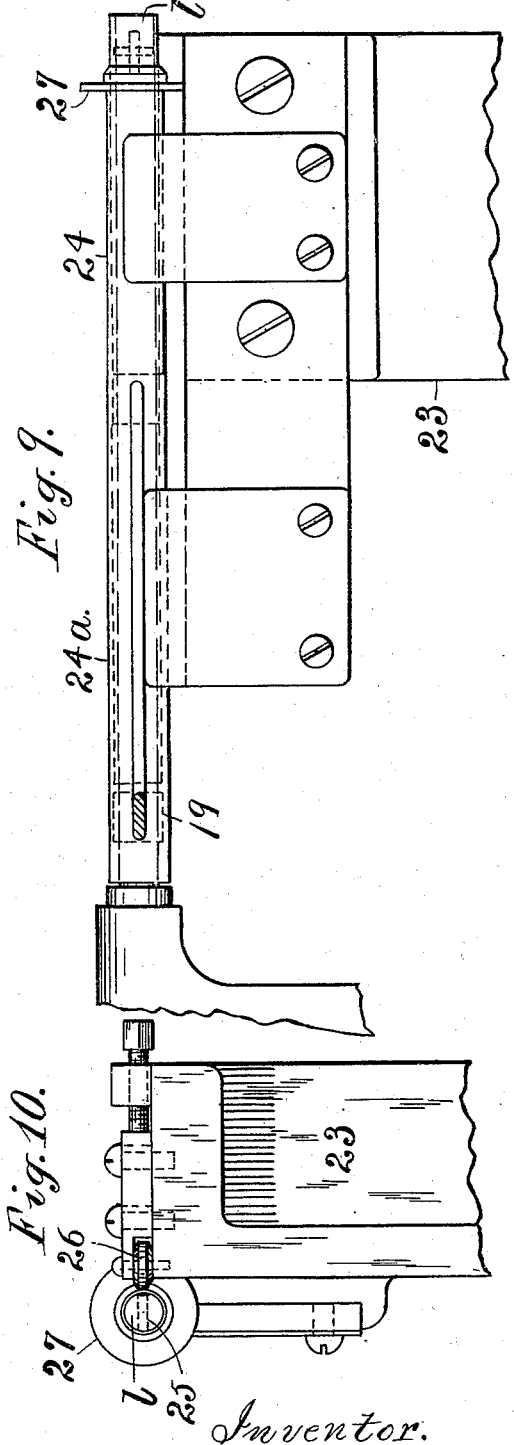
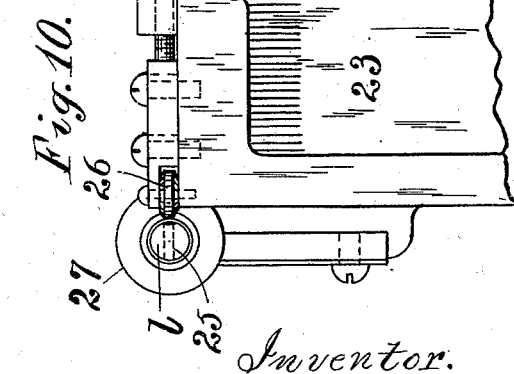
Attest:
L. Lee.
Walter H. Talmage.
Inventor.
Frank J. Ludington, per
Thomas S. Crane, Atty.

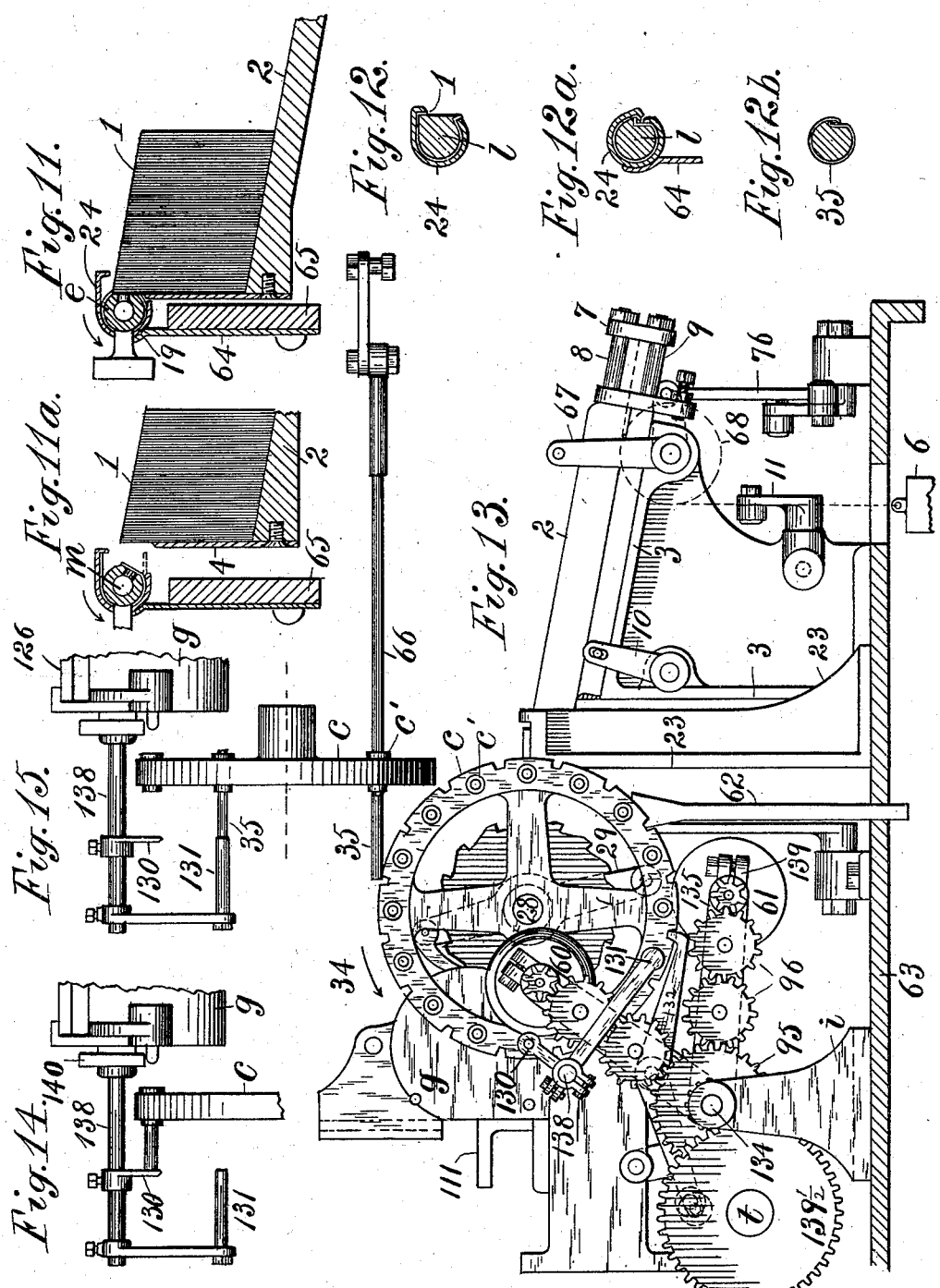

No. 705,591. Patented July 29, 1902.
F. J. LUDINGTON.
MACHINE FOR MAKING INDIVIDUAL CIGARETTES.
(Application filed Aug. 31, 1901.)
(No Model.) 9 Sheets—Sheet 5.

Attest:
L. Lee.
Walter H. Talmage.

Inventor.
Frank J. Ludington
per Thomas S. Crane, Atty.

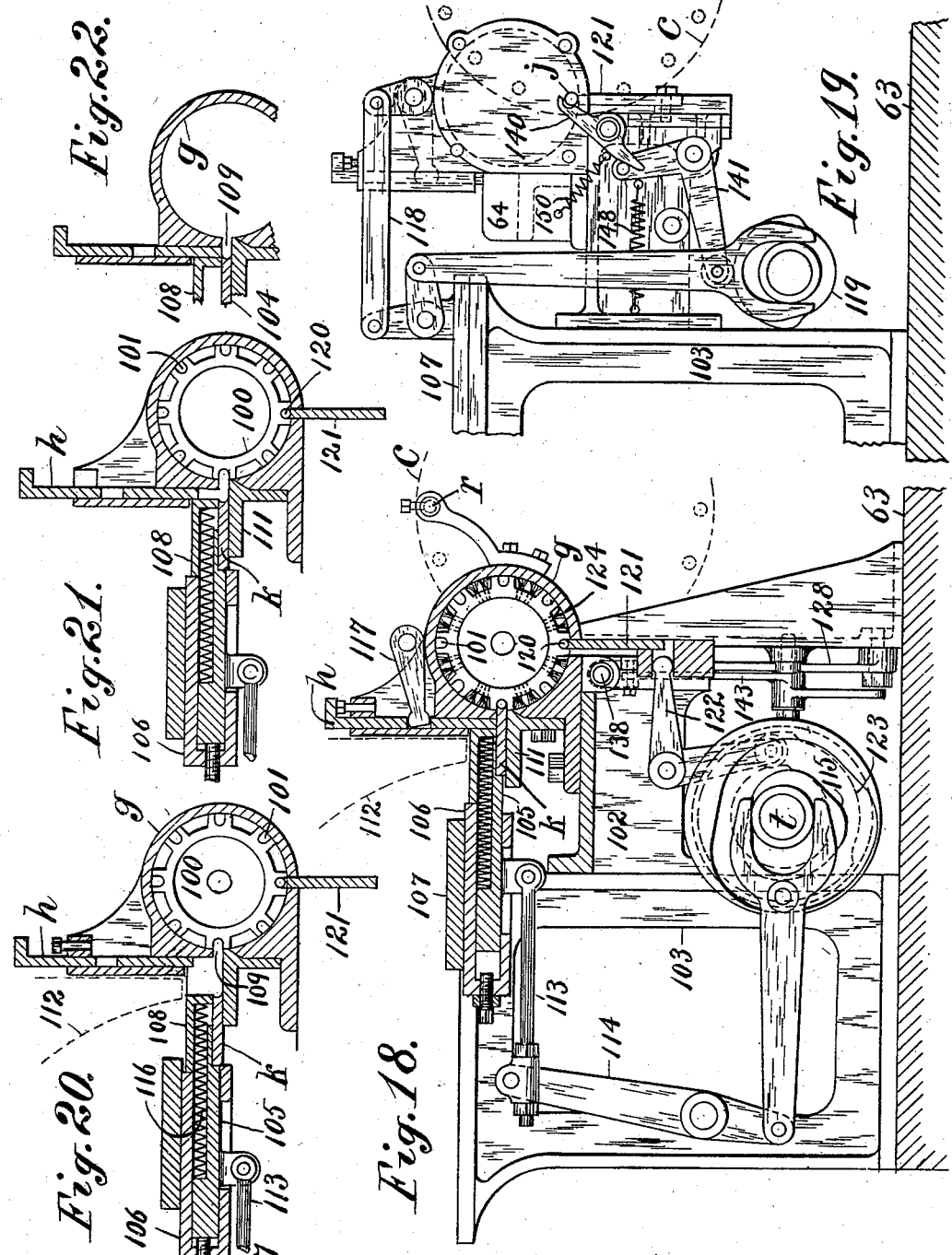

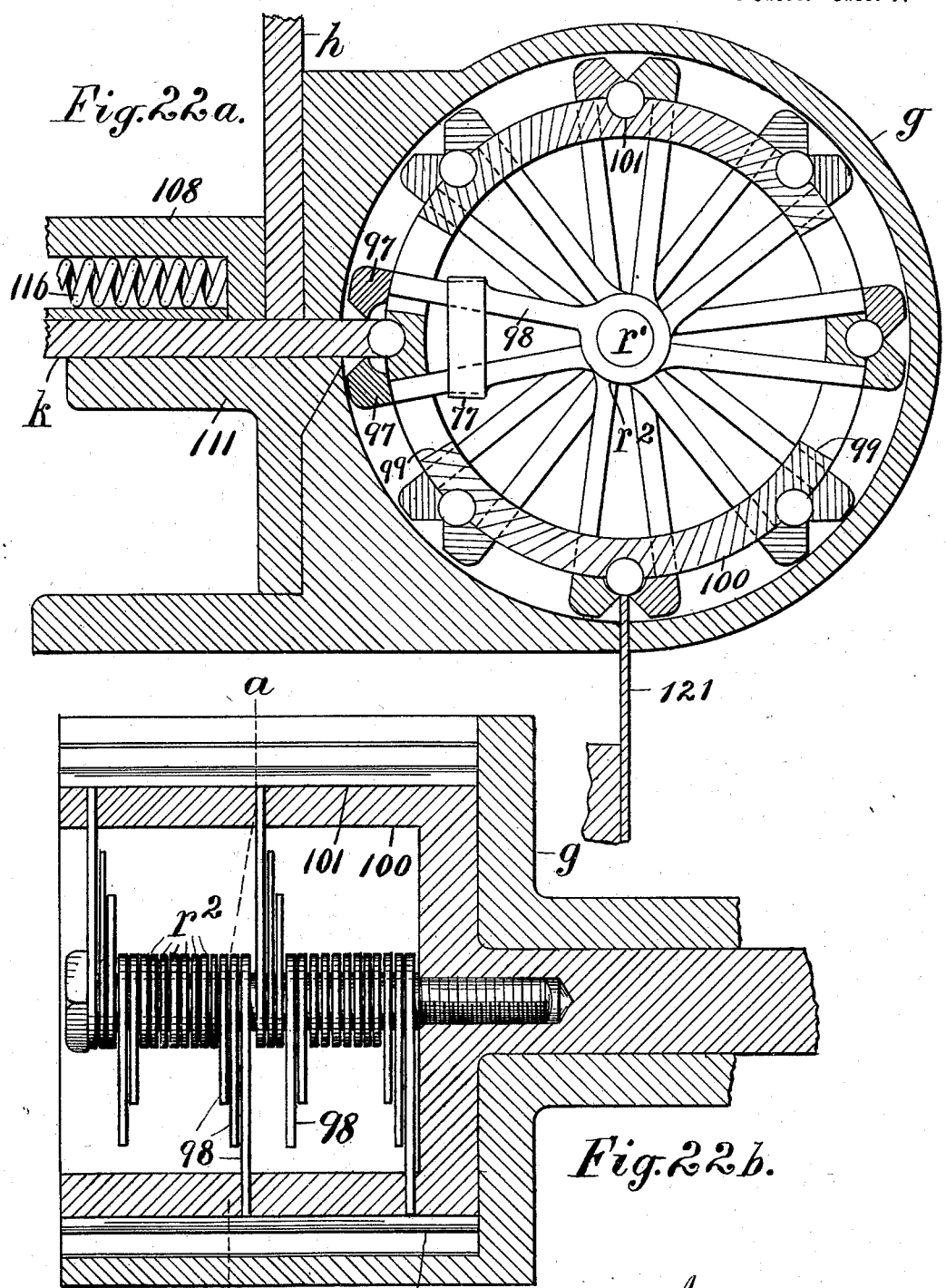

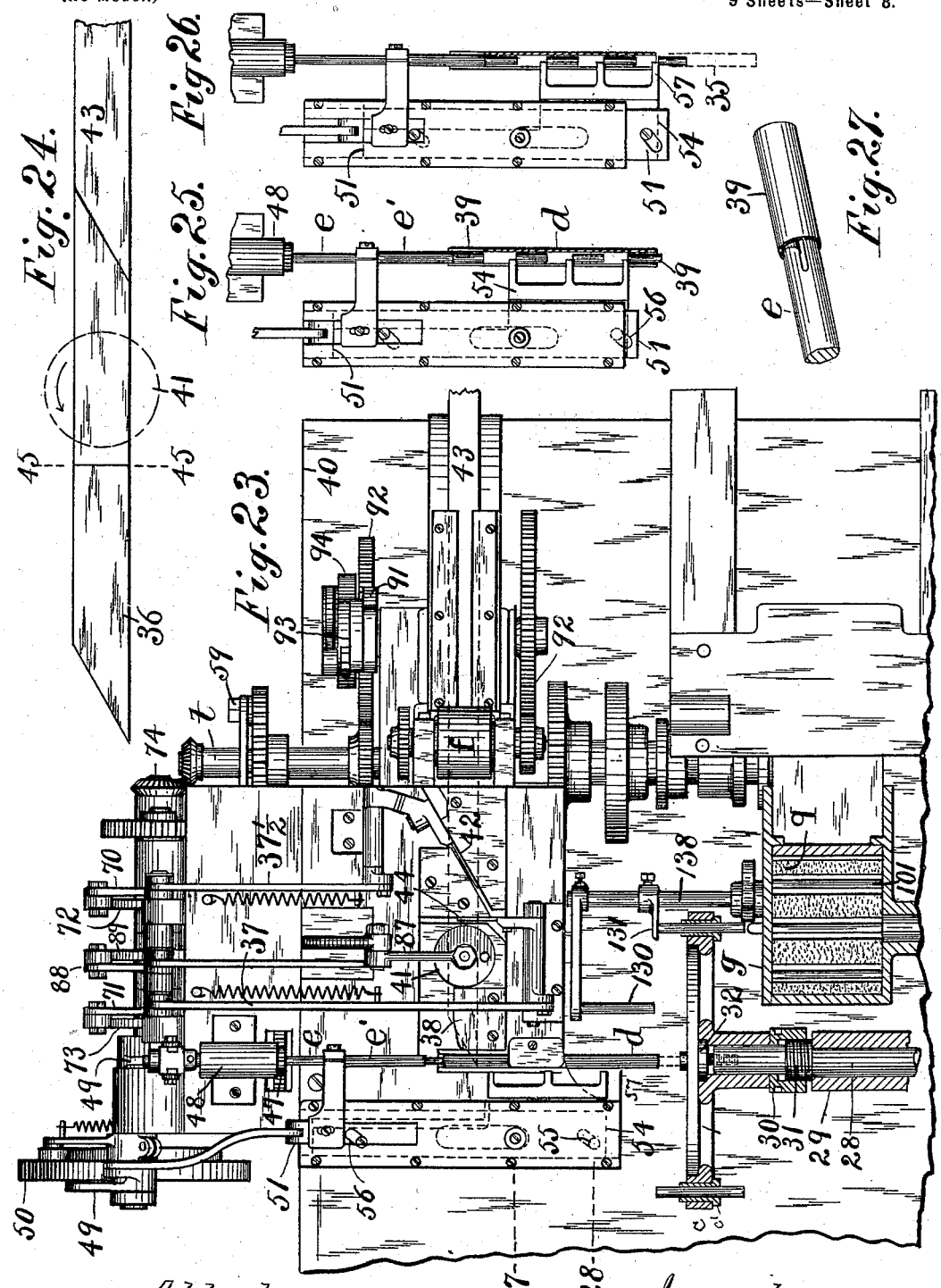

No. 705,591. Patented July 29, 1902.
F. J. LUDINGTON.
MACHINE FOR MAKING INDIVIDUAL CIGARETTES.
(Application filed Aug. 31, 1901.)
(No Model.) 9 Sheets—Sheet 9.
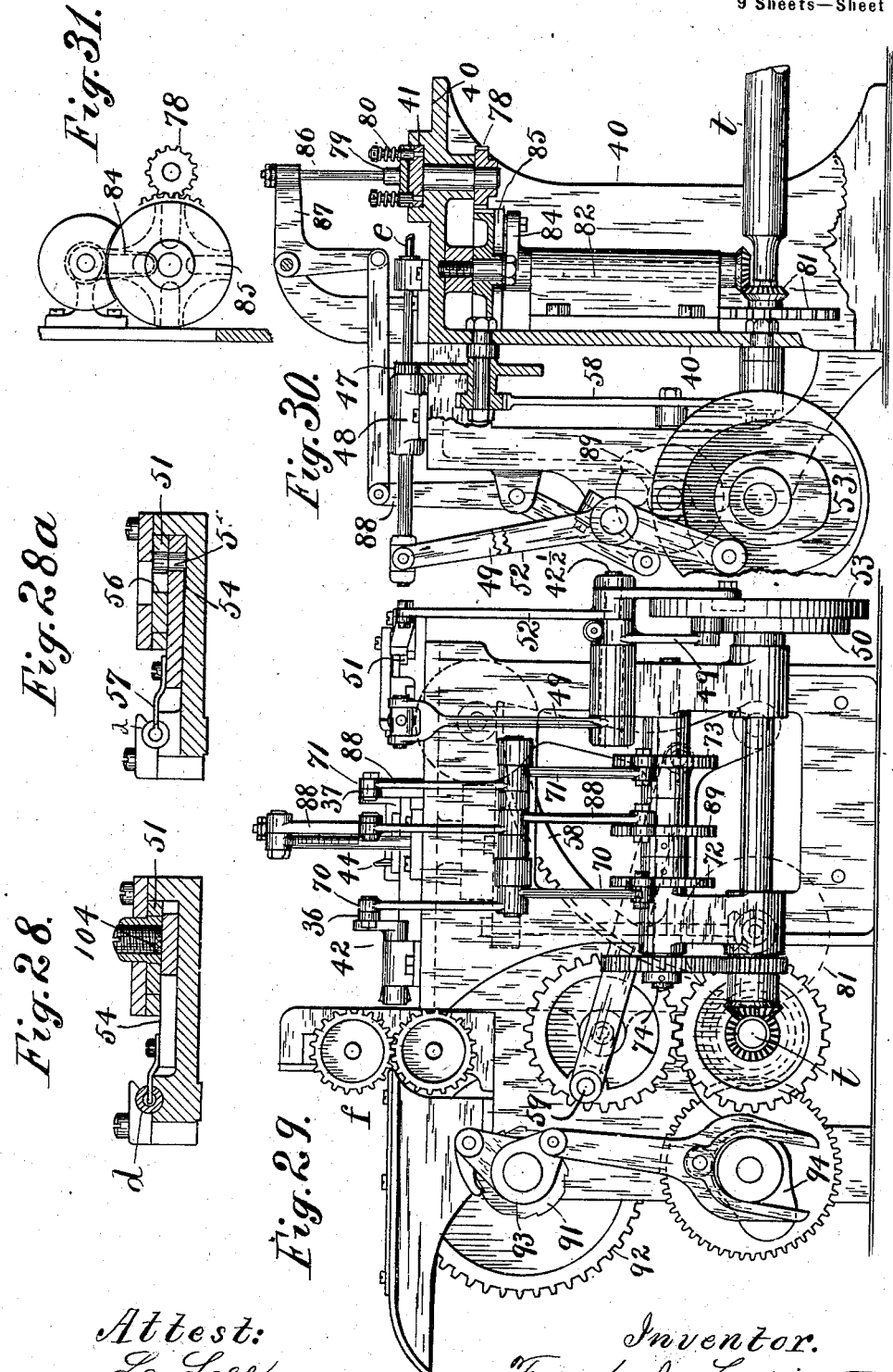
Attest:
L. Lee.
Walter H. Talmage.
Inventor.
Frank J. Ludington
per Thomas F. Crane, Atty the shell, and trimming the tobacco from one or
UNITED STATES PATENT OFFICE.

FRANK J. LUDINGTON, OF WATERBURY, CONNECTICUT.

MACHINE FOR MAKING INDIVIDUAL CIGARETTES.

SPECIFICATION forming part of Letters Patent No. 705,591, dated July 29, 1902.

Application filed August 31, 1901. Serial No. 73,980. (No model.)

*To all whom it may concern:*

Be it known that I, FRANK J. LUDINGTON, a citizen of the United States, residing at 27 West Main street, Waterbury, county of New Haven, State of Connecticut, have invented certain new and useful Improvements in Machines for Making Individual Cigarettes, fully described and represented in the following specification and the accompanying drawings, forming a part of the same.

The present machine is designed to operate upon individual wrappers to form them into tubes or shells and to mold the individual fillers and insert the same in the shell and trim the tobacco from both ends of the shell, and thus deliver the cigarette in readiness for packing.

Continuous cigarettes have been heretofore made with a crimped wrapper; but none of the operations which serve to crimp an endless wrapper are suitable for crimping the seam of small individual sheets of paper which require to be wound transversely to bring them into tubular form and cannot be drawn forward through crimping-tools by a preceding portion of the endless tube. The present invention therefore includes special means for handling the individual wrappers and crimping the seam of each independently.

Many advantages result from the crimping of the seam in making shells for individual cigarettes, as the complication of mechanism required for pasting the joint is avoided, the delay and the mechanism necessary to dry the joint of each shell before it can receive the filler is also avoided, and the seam of the wrapper is made more smooth and even than where paste is employed, which tends more or less to pucker the paper along the line of the joint.

The appearance of high-grade cigarettes is a matter of considerable importance, and machinery which will make the individual cigarettes without any disfigurement at the seam is a decided improvement in the art.

My invention includes means for advancing a stack of cigarettes to a rotary winding-arbor and loosening the pressure upon the stack when one of the wrappers has been drawn against vacuum-ports upon the arbor. It also includes means for winding the wrapper into a shell, forming the edges of the wrapper into a lock-joint and crimping the same, forming mouthpieces when required and inserting one in each of the previously-formed shells, forming the tobacco filler, presenting the shell with or without such mouthpiece to the filler-forming devices, placing the filler within the shell, and trimming the tobacco from one or both ends of the shell, and all of these operations carried on simultaneously in a machine which is absolutely automatic, so that the mere supplying of the wrappers and of the suitably-prepared tobacco enables the machine to deliver high-grade cigarettes at very great speed and at a very low cost of production.

My invention consists in the improvements herein described, and set forth in the annexed claims.

The invention will be understood by reference to the annexed drawings, in which—

Figure 16:
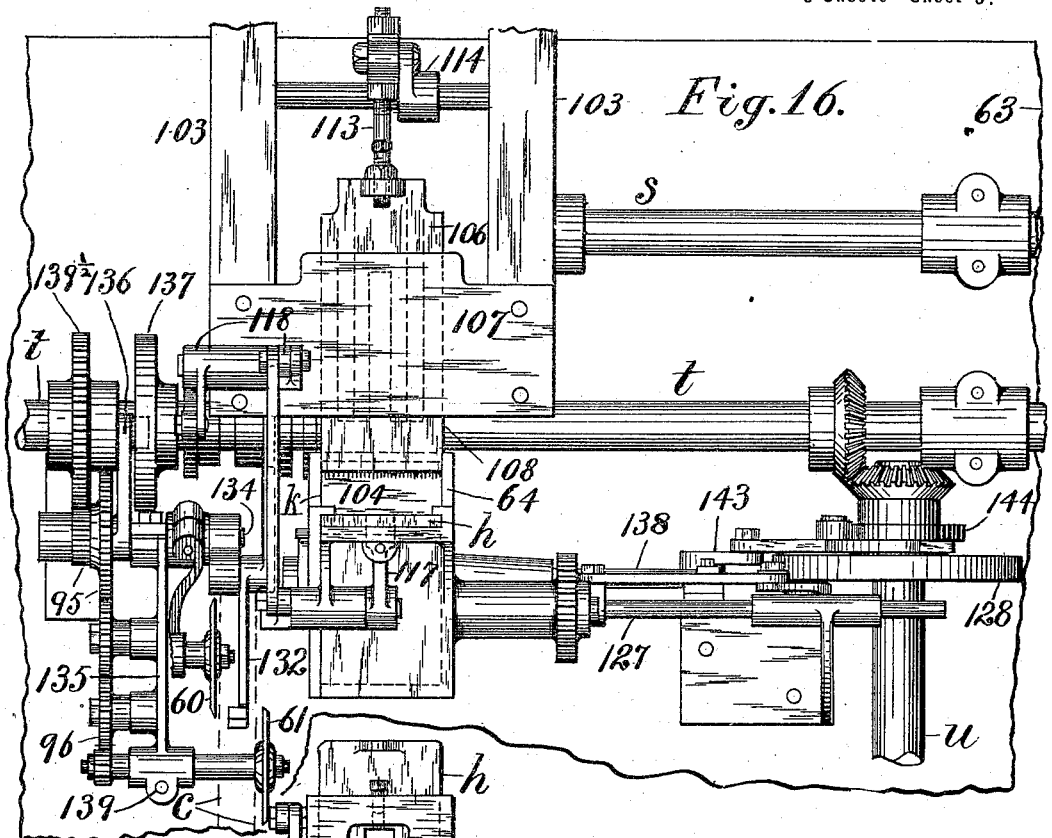
Figure 17:
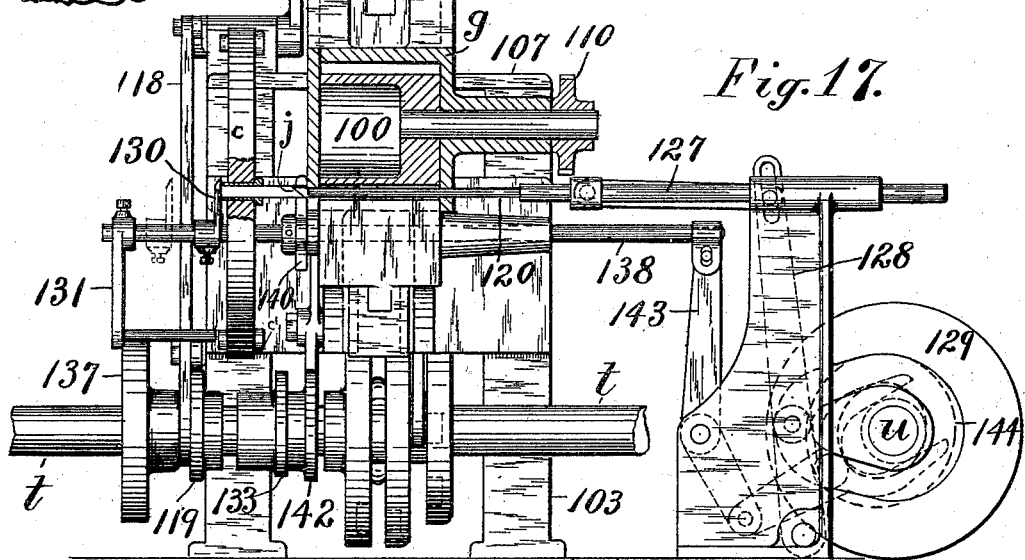

Figure 1 is a plan of the machine with certain details omitted (as they are shown upon a larger scale in the other figures) and portions shown in section where hatched. Fig. 2 is a plan of the shell-winding appliances with part of the appliances for feeding the wrapper. Fig. 3 is a front elevation of the shell-winding and wrapper-feeding appliances. Fig. 4 is a side view of the wrapper-feeding appliances. Fig. 5 is a section of the clutch for actuating the presser for the wrappers. Fig. 6 is a bottom view, and Fig. 7 an end view, of the crimping-mandrel. Fig. 8 is a plan of the crimping-tools and one of the paper shells with the parts in section at the center line where hatched. Fig. 9 is a view of the rear side of the same, and Fig. 10 is an end view of the crimping-mandrel and stationary crimping-roll with the supporting-post. Fig. 11 shows the parts adjacent to the winding-arbor $b$ before winding the mandrel. Fig. 11ª shows the same parts after the winding of the wrapper. Fig. 12 is a section of the crimping-mandrel and seaming-tool on line $x\,x$ in Fig. 8. Fig. 12ª is a similar section on line $y\,y$ in Fig. 8. Fig. 12ᵇ is a similar section of the wrapper-feeder, the carrier-disk, the filler forming and trimming devices on line $z\,z$ in Fig. 8. Fig. 13 is a side elevation of the wrapper-feeder, the carrier-disk, and the filler forming and trimming devices. Fig. 14 shows the position of the locators when the filler-punch discharges the cigarettes from the nozzles. Fig. 15 shows the position of the locators when setting the cigarette to trim the inner end. Fig. 16 is a plan of the filler forming and trimming devices. Fig. 17 is an elevation of the filler-forming devices with the parts (in section where hatched) at the center line of the filler-drum. Fig. 18 is a side elevation of the filler-forming devices (in section where hatched) at the middle of the filler-drum. Fig. 19 is an elevation of part of the same devices with the means for actuating the vertical slide and the shell-clamp. Figs. 20, 21, and 22 are sectional diagrams showing the filler-forming mechanism in different positions. Fig. $22^a$ is an enlarged cross-section on line $a\ a$ in Fig. $22^b$ of the drum-casing $g$ with a drum having compressing-dies. Fig. $22^b$ is a plan of such drum. Fig. 23 is a plan of the mouthpiece-tools with the dial and filler-drum case in section at the center line of each where hatched. Fig. 24 is a diagram showing the cutting and reversing of the alternate mouthpiece-blanks. Fig. 25 is a plan of the mouthpiece guide-tube in horizontal section with the stripper and inserter partly advanced, and Fig. 26 is a similar plan with the stripper and inserter at the end of one stroke. Fig. 27 is a perspective view of the forked end of the winding-spindle with the mouthpiece thereon. Fig. 28 is a cross-section on the dotted line designated 28 in Fig. 23. Fig. $28^a$ is a similar section on dotted line 27 in Fig. 23. Fig. 29 is a rear elevation of the gearing for the mouthpiece-winding device. Fig. 30 is a side elevation of the same in section where hatched on two planes, one at the center of the winding-spindle and the other at the center of the reversing-disk. Fig. 31 is a plan of the star-wheel gearing for turning the reversing-disk, the view being taken at the top of the star-wheel.

In Fig. 1, $a$ designates the wrapper-feeding appliance; $b$, the wrapper-winding arbor; $l$, the wrapper-crimping appliances; $c$, the carrier-disk to receive the shells from the crimping-arbor; $d$, the guide-tube for the mouthpieces to insert them in the shells.

$e$ designates the winding-spindle for the mouthpieces; $f$, the rolls for feeding the mouthpiece-blanks; $g$, the filler-drum case; $h$, the vertical filler-forming slide; $k$, the horizontal filler-forming slide, and $i$ the stand for the cigarette-trimming cutters, which are omitted and shown in Figs. 13 and 16.

$s$ designates a driving-shaft geared to two auxiliary shafts $t$ and $u$. The shaft $s$ is driven by a pulley $v$, preferably a friction-clutch pulley. A suction-pump $w$ is connected with the shaft $t$, and its inlet-pipe $x$ is connected by pipe $o$ with a duct inside the winding-arbor $b$, which is provided with ports to hold the paper wrapper while winding the same.

*Description of wrapper winding and crimping devices.*—In Figs. 2 to 13, inclusive, 1 designates the cigarette-wrappers, set upon edge to form a stack in a magazine or trough 2, which is supported upon a stand 3, the trough being set transverse to the winding-arbor $b$ and closed by a front plate 4 just beneath the arbor, as shown in Figs. 11 and $11^a$ and lettered in Fig. $11^a$. The winding-arbor is extended across the length of the wrapper and is flattened upon the side next the wrappers and formed with a duct $m$ and ports opening toward the wrappers when ready to wind the same. A suction-pipe $o$ is held in the duct of the arbor and is connected with the suction-pump inlet $x$. The wrappers are pressed normally toward the stop 4 by a pusher 5, actuated by weights 6, which operate through cords over pulleys 68, and a cross-head 7 and push-rods 8. The cross-head is guided by a rod 9, fitted movably in the stand 3. The trough or magazine is shown in Fig. 3 fitted to a dovetail guide upon the stand 3 and is movable to and from the arbor $b$ by cranks 10, which are actuated (through connections and gearing marked 11) by a cam 12. (Shown in Figs. 1 and 2.) The pusher 5 is retracted during the winding of each wrapper (to loosen the adhesion of each wrapper to the stack behind it) by a clutch 65, hinged upon arms 67 on the shaft of the pulleys 68. The clutch is an arm hung loosely upon a bar 69, connecting the arms 67, and is bored to fit the push-rods 8 loosely and pressed lightly forward by a spring $n$, as shown in Figs. 4 and 5, so as to pinch the same when inclined thereto. The arms 67 are suitably oscillated by a cam 75 and connections 76. The winding-arbor $b$ is mounted in a stand 13 and is connected by gearing (marked 14) with a spindle having an arm 15, which has an adjustable crank-pin. A link 16 connects the crank-pin with a lever 17, which is actuated by a cam 18 upon the driving-shaft $u$. By adjusting the crank-pin in the arm 15 the oscillations of the lever 17 may be made to produce the required rotation of the winding-arbor. (See Figs. 2 and 3.) A U-shaped wrapper-former $24^a$ is held around the arbor $b$ to form the wrapper in suitable shape to push upon the crimping-mandrel $l$, and the mandrel is encircled with a seaming-tube 24, which is continuous with the former $24^a$. (See Fig. 8.) A shifter 19 is held movably upon the arbor and is slid longitudinally after the winding of each wrapper to shift the same endwise to and upon the crimping-mandrel $l$. The shifter is suitably reciprocated by a bar 20, supported upon the stand 13 and actuated, as shown in Figs. 1 and 2, by a lever 21 and by a cam 22 upon the shaft $u$, and slides between the former $24^a$ and the arbor $b$. The crimping-mandrel $l$ is a stationary continuation of the winding-arbor $b$ and is supported upon a stand 23, which holds the seaming-tube 24 and wrapper-former $24^a$. The tube and mandrel are shaped as shown in Figs. 12, $12^a$, and $12^b$, so as to interlock the edges of the wrapper when it is pushed from the arbor by the shifter 19. The forward end of the mandrel is slotted and provided with the crimping-roll 25, and a stationary roll 26 is supported adjustably upon the stand 23 to press the seam of the shell upon the roll 25, the seam being crimped between the rolls by the movement of the shell. The carrier-disk $c$ forms a carrier with transverse holes to receive the crimped shells and transfer them, first, to the mechanism which furnishes the shells with the mouthpiece; second, to the mechanism which inserts the tobacco rod; third, to the mechanism which trims off the tobacco, and, finally, to an ejector which discharges the cigarette from the transverse holes, and the axis of the carrier-disk is shown set on a level with the winding-arbor and crimping-mandrel, so that a hole at one edge of the carrier-disk may be set in line with the mandrel and receive the finished shell when pushed therefrom.

The operation of the winding and crimping devices is as follows: The magazine or trough 2 is advanced by the arms 10 to press the stack of wrappers against the flat side of the mandrel $l$, as shown in Fig. 11, the wrappers being then pressed against the plate 4 by the weights 6. The pusher 5 is then drawn backward by the cam 75 and clutch 65 about an eighth of an inch to release the pressure upon the wrappers adjacent to the one next the mandrel, and the pump $w$ is then actuated to form a vacuum within the arbor, and the pusher is then still farther retracted to wholly loosen the first wrapper from the others. The trough 2 is then retracted a little from the arbor by the arms 10, as shown in Fig. 11$^a$, to separate the first wrapper from the others. While the wrappers are thus separated the winding-arbor is rotated by the gearing 14, arm 15, and cam 18 (in the direction indicated by the arrow in Fig. 11) somewhat less than a complete revolution, and the pump is then reversed to release the wrapper, which then lies in U shape with its edges one above the other inside the former 24$^a$. The shifter 19 is then advanced to push the U-shaped paper into the seaming-tube 24, which has flanges at its edges adapted to gradually fold the edges of the wrapper and interlock the same, and the mandrel $l$ is grooved, as shown in Figs. 12, 12$^a$, and 12$^b$, to coöperate with the flanges. The flanges of the tube 24 are tapered upon their edges and operate progressively to bend the edges of the paper into flanges, which are lapped one over the other and finally interlocked, as shown in Fig. 12$^b$. Adjacent to the roll 25 in the crimping-mandrel is a collar 27, which is held from end movement by a fork upon the stand 23, and the motion of the shifter advances the forward end of the paper shell through such collar a little past the crimping-rolls and the end of the mandrel, as shown in Fig. 8. The collar tightly closes the seam before it is crimped. In thus pushing the shell forward the shifter enters a little way into the seaming-tools, and when it is successively reciprocated it causes each shell 35 to push the preceding one past the crimping-rolls 25 26 into the hole upon the carrier-disk $c$. Such forward movement of each shell moves the entire length of its seam between the crimping-rolls 25 26, and thus joins the overlapped edges of the paper in a suitable manner.

The crimping-rolls are in practice serrated upon the edge, which enables them to slightly penetrate the paper and to interlock the fibers of the folded edges, so as to hold the seam firmly together without puckering or expanding the material or deforming the wrapper in any manner. The serrations are not shown upon the drawings on account of the smallness of the scale.

*Description of carrier-disk for shells and cigarettes.*—The carrier-disk $c$ serves as a carrier, and its relation to the other devices is shown in Figs. 1, 2, 13, and 14, as well as its actuating mechanism. Its shaft 28 is mounted in a bearing upon a stand 29 midway between the axis of the winding-arbor $b$ and the filler-drum casing $g$, containing the filler-drum 100, which is formed with longitudinal grooves 101, in which the filler is molded. The carrier-disk is shown with sixteen holes containing bushings $c'$ to receive cigarettes of a given diameter, the holes in two opposite edges being, as shown in Figs. 1 and 2, in line, respectively, with the mandrel $l$ and with the bottom groove in the drum 100 and the top hole in line with the guide-tube $d$, which delivers the mouthpieces when desired to the shells. The carrier-disk and its shaft-bearing are shown in section in Fig. 23, the carrier-disk being adjustable upon its shaft by means of a nut 30, fitted to a thread 31 upon the shaft, and secured by means of a locking-bolt 32, fitted into the end of the shaft. Such adjustment is required to bring the ends of the bushings $c'$ into the proper longitudinal relation with the other parts of the apparatus in cases where shells of different lengths are used, and especially in cases where mouthpieces are inserted in the shells. The bushings $c'$ are brought successively to the same position in line with the mandrel $l$ (see Fig. 1) by a ratchet-wheel upon the shaft 28 and a pawl upon a double-armed lever 29, which is oscillated by a cam 33 upon the shaft $t$. Gears 110, which connect this shaft and drum $q$, are omitted from Fig. 13. The carrier-disk revolves in the direction of the arrows 34, (shown in Figs. 1 and 13,) and thus carries the shell first to the tube $d$, where the shell may be provided with a mouthpiece, if desired, in the manner hereinafter described, the bushing $c'$ then being at the top of the wheel, as indicated in Fig. 1. Further movements of the carrier-disk carry the bushing down to the level of its shaft, which brings it opposite a nozzle upon the filler-drum casing $g$, where it receives the tobacco filler, (see Fig. 17,) and the cigarette is then carried down successively within the range of the revolving cutters 60 and 61, which when required trim the opposite ends of the cigarette, and it is then discharged from the bushing by a suitable ejector 66, permitting it to drop into a chute 62, leading it downward through the bed-plate 63, upon which the mechanism is mounted, as shown in Fig. 1.

*Mouthpiece-making attachment.*—Figs. 23 to 31, inclusive, show the appliances which constitute this attachment, that can be used at option in connection with the shell-making and filler-forming devices. A stand 40 supports the winding-arbor $e$ at a level with the top bushing in the carrier-disk, a guide-tube $d$ being secured in line with the winding-spindle $e$ and slotted at one side, as shown in Figs. 28 and 28ª, to admit fingers for pushing the mouthpieces 39 successively into the shells. Feed-rolls $f$ (see Figs. 29 and 33) are suitably arranged to feed a strip of paper under two shears and through a reversing-disk 41 to the winding-arbor. One shears 42 is set close to the rolls $f$, obliquely to the paper strip 43, and the other shears 44 is set transverse to the strip and nearer to the winding-spindle. The blanks 36 are alternately cut square at one end and with an acute point at the other. The shears are operated alternately, and after each actuation of the oblique shears the reversing-disk is pressed upon the paper and turns the blank one-half a rotation to bring its point into the slot in the end of the guide-tube $d$. The operation of the shears and reversing-disk 41 is illustrated in Fig. 1, from which the upper cutting-blades and many details of construction are omitted. The reversing-disk 41 is set midway between the point of the blank which is cut off by the oblique shears 42 and the position which such point occupies when the blank is turned a half-rotation, so that its point enters a slot in the rear end of the guide-tube. The shears 44 is set close to the reversing-disk, and the parts are so proportioned that the distance from such transverse shears and the winding-arbor is sufficient to form the blank for a mouthpiece. A dotted line 45 is shown in Fig. 24 at the side of the reversing-disk opposite to the shears 44, and the feed-rolls are operated to alternately feed the paper strip 43 a short and long step, the short movement being effected after each actuation of the shears 44 to carry the rectangular end of the strip 43 to the line 45, after which the oblique shears 42 operate, and the disk makes a semirotation in the direction of the arrow 46 in Fig. 1 to turn the point of the blank into the fork of the winding-spindle. After such reversing movement the blank is advanced the long step, which carries the last-cut point of the strip from the oblique shears into the guide-tube in line with the winding-spindle. The transverse shears 44 then sever the blank in the rear of the disk 41, and the blank is then wound by the spindle $e$. Fig. 24 shows the alternate arrangement of the blanks as they are severed from the strip 43 and their relation to the reversing-disk 41. The winding-spindle $e$ (see Figs. 1, 23, and 30) is splined to a gear 47, having a hub extended through a bearing 48, and the spindle is moved longitudinally before winding the paper by connection to a lever 49 and cam 50. (See Figs. 29 and 30.) The arms of the lever 49 are attached to a shaft $42\frac{1}{2}$, upon which a lever 52 is fitted loosely, so as to lock when actuated by cam 53. The lever 52 reciprocates a slide 51, having pins 55, fitted to oblique slots 56 in an underlying plate 54, which carries fingers 57 to force the mouthpieces into the shells. A friction-shoe 104 holds the plate 54 from slipping, and the pins 55 operate to shift the plate and fingers laterally as the fingers are pushed forward and to retract the fingers from the guide-tube as they are drawn backward. The cam 50 holds the winding-spindle in a retracted position to clear the paper blanks which are reversed, and as the point of the paper blank is inserted in the guide-tube, as shown in Fig. 23, the fork in the end of the winding-spindle is horizontal, and the cam 50 then advances the spindle to engage the point of the blank. The slide 51 carries a stripper $e'$ on the shank of spindle $e$. A guard 38, Fig. 23, is set between the turn-table and the guide-tube $d$ to direct the point of the blank into the fork. The winding-spindle is then advanced upon the point of the blank to wind the same, with the stripper $e'$ retracted, as would be the case during the winding operation. Fig. 27 shows the mouthpiece 39 upon the end of the spindle $e$ as it is completed within the guide-tube $d$. Fig. 25 shows the stripper $e'$ advanced in contact with the coiled mouthpiece 39 to hold the same while the spindle is retracted. To facilitate the release of the spindle from the mouthpiece before its retraction, the rotation of the spindle is reversed, thus loosening the forked end from the coil. The means for rotating the spindle is shown in Figs. 29 and 30 and consists of a gear-segment 58, oscillated by suitable connections to a crank-pin 59 upon a crank-plate driven by gearing upon the shaft $t$. The gear 47, through which the winding-spindle $e$ is traversed by the cam 50, is thus rotated alternately in opposite directions, and the movement of the crank-pin 59 is so timed as to reverse the rotation of the spindle after winding the mouthpiece when the stripper is in the position shown in Fig. 25, whereby the coil is loosened from the forked end of the spindle, as shown in Fig. 27, so that the mouthpiece can be readily withdrawn. The fingers 57 are shown in Fig. 23 retracted from the bore of the guide-tube, as occurs during the backward movement of the slide 51 and bar 54; but the advance of the stripper to the position shown in Fig. 25 forces the fingers first into the bore of the guide-tube and then forward to engage the mouthpieces therein, as shown in Fig. 25. The advance of the slide carries the stripper forward after the winding-spindle has been retracted and moves the mouthpiece last wound forward in the guide-tube in the same degree that the preceding ones are carried forward by the fingers. The completion of this movement is shown in Fig. 26. The feeding movement of the paper blanks 36 is so timed that the point of one blank is advanced into the guide-tube by a direct movement after each cut of the transverse shears 44 or by the rotation of the disk 41 after each operation of the oblique shears 42. The guide-tube $d$ is suitably slit next the disk 41 to permit the insertion of the blank, and when the paper is in place the forked end of the spindle $e$ is advanced and the blank wound into a mouthpiece. With the construction shown three of the mouthpieces are in the guide after each mouthpiece has been discharged, one of them being represented outside of the guide-tube in Fig. 26, with a dotted line representing the shell 35, which would receive the mouthpiece. The elasticity of the mouthpiece causes it to uncoil when it enters the shell from the guide-tube, and thus holds it firmly within the shell. The mechanism for actuating the shears is shown in Figs. 23, 29, and 30, each movable shear-blade being pivoted upon a suitable bearing adjacent to a stationary blade upon the stand 40 and oscillated by connections to cams 72 and 73. The cams are mounted upon a shaft 74, which is geared to the auxiliary shaft $t$ and operate the movable shear-blades, respectively, through the levers 70 and 71 and suitable links 37 and 37½. (See Fig. 23.) The levers 49 and 52 are broken in Fig. 30 to show both, as one lies in front of the other. The levers 70 and 71 are omitted from Fig. 30, which shows the appliances for actuating the winding-spindle and for actuating the reversing-disk 41. This disk is seated upon a spindle in a recess upon the stand 40, with its upper surface in line with the path of the paper blank, and it is provided with a cap 79, pressed normally downward by springs 80, which grip the paper blank during the rotary movement of the disk. The disk is revolved by the driving-shaft $t$ through spur and bevel-gears 81, which rotate a vertical shaft 82, upon the top of which a crank 84 is fixed to coöperate with a star-wheel having grooves 85, which star-wheel is connected by gears 78 to the spindle of the reversing-disk. Only a part of the large gear-wheel is shown in Fig. 31. The crank 84 is rotated continuously by its gearing; but according to the usual operation of a star-wheel it acts intermittently upon the grooves 85 to turn the disk one-half a rotation and then hold it locked during the period in which the paper strip 43 is advanced. The cap 79 is provided with a lifting-spindle 86, fitted to a bell-crank 87, which is connected by a link with a lever 88, actuated by a cam 89 upon the shaft 74. Such cam is operated to lift the cap 79 during the advance of the paper strip and then drop it for clamping the strip during the semirotation of the disk. The feed-rolls $f$ are alternately actuated to advance the paper strip 43 in long and short steps by a pawl actuating upon a ratchet-wheel 91, which is provided with alternate short and long teeth, as shown in Fig. 29. The ratchet-wheel is connected by gears 92 (shown in Figs. 23 and 29) to the feed-rolls $f$, and the pawl is mounted upon a lever-arm 93, which is oscillated by connection to a cam 94. The movements of the various cams and connections are timed to successively feed and cut the paper blanks, advance them to the winding-spindle, wind them into mouthpieces, and discharge them from the guide-tube $d$, as already described, and one of such mouthpieces is discharged at each actuation of the shell-forming devices and the intermittent movement of the carrier-disk $c$. The shell is supported while receiving the mouthpiece by a stop $r$. (Shown in Figs. 1 and 18.)

*Filler-forming devices.*—The filler-forming devices include a drum 100, intermittently rotated by gears 110, connecting it with the shaft of the carrier-disk $c$. The drum has grooves 101 in its periphery, and slides are provided to form the filler in the grooves and also to press the filler after it is formed, just before it is placed in the shell. The carrier-disk is shown with sixteen bushings to receive shells, and the drum is shown with eight grooves to receive fillers and is therefore geared to rotate twice for each revolution of the carrier-disk. The casing $g$, which contains the drum, is provided with a horizontal slot at the side, which forms an inlet for the charge of tobacco. The casing $g$ is supported upon a bracket 102, carried by two stands 103. A punch $k$ is attached to a slider 105, which is fitted movably within a ram 106, and the ram is fitted to reciprocate in a holder 107, mounted upon the stands 103. To the ram is attached a spring tobacco-presser 108, and a shelf 111 is provided to receive a charge of tobacco in front of the inlet 109 upon the drum-casing $g$. (See Figs. 20 and 21.) The tobacco is prepared by suitable pickers and delivered to a spout 112 in a uniform supply at a proper rate to furnish the fillers for th shells. The appliances for preparing and feeding the tobacco are not shown, as they form no part of the present invention. Cheeks 64 are formed at the sides of the shelf to retain the tobacco thereon, as shown in Fig. 19. The presser 108, attached to the ram, has no positive movement, but is actuated by a spring 116, fitted to a socket in the slider 105 and abutting against the slider 105 and the presser 108 to force the presser normally forward. The retraction of the presser is adjusted, as shown in Fig. 20, by screw 127, which contacts with the rear end of the slider when the presser is flush with the punch $k$. The slider 105, carrying the punch $k$, is actuated positively by a rod 113, which is connected by a lever 114 and a suitable roller-arm with a cam 115. The shelf is provided with cheeks 64, (shown in Fig. 19,) and the spout 112 (the nozzle of which is merely indicated in dotted lines in Figs. 18 and 20) is arranged to discharge the prepared tobacco upon the shelf between the cheeks. A vertical slide $h$ is mounted above the inlet 109 and is actuated by crank 117 and suitable connections 118 to a cam 119. (Shown in Fig. 19.) The casing $g$ is provided with holes at the opposite ends of the bottom groove in the drum, and a filler-punch 120 is fitted to the rear hole, and the front hole is provided with a nozzle $j$, of thin steel, sloped upon one side to facilitate the application of the cigarette-shell 35 thereto, as shown in Fig. 17. A bottom slide 121 is fitted to a slot in bottom of the casing in line with the nozzle $j$ and is actuated, as shown in Fig. 18, by a crank-arm 122 and cam 123 upon the shaft $t$. To form each tobacco filler, the punch $k$ and the tobacco-presser 108 are retracted, as shown in Fig. 20, during a given time, in which a suitable charge of tobacco from the spout 112 accumulates upon the shelf. The ram and punch are then moved forward, as shown in Fig. 21, bringing the presser into contact with the vertical slide $h$. The vertical slide is then depressed to the top of the inlet 109, as shown in Fig. 22, condensing the tobacco to the thickness of the punch $k$, which is thus enabled to force it into a groove of the drum, as shown in Fig. 18. A filler is thus formed, in each groove, of the tobacco which has been repeatedly compressed by the presser 108, slide $h$, and punch $k$. Fig. 18 shows means to clean the punch. Brushes 124 are provided upon the periphery of the drum, the punch $k$ is retracted before each movement of the drum to the inner side of the inlet, and the next rotation of the drum moves the brushes across the bottom of the groove in the punch, and thus cleans any fibers of tobacco from it which might accumulate upon and operate to deform the fillers. The tobacco always possesses some elasticity; but the repeated action of the agencies described molds it gradually into a cylindrical form, from which it makes very little reaction. Before the tobacco filler is put in the shell such reaction is, however, corrected, with the construction shown in Figs. 18 to 21, by the bottom slide 121, which is pressed upwardly as soon as the groove containing the filler is moved in line with the nozzle $j$, thus reshaping the filler and giving it a final compression. The slide is then retracted very slightly to hold the filler in form, but permit its free discharge from the groove. With the construction shown in Figs. 22$^a$ and 22$^b$ the reaction is prevented, and the tobacco filler is kept under compression during its movement from the inlet to the outlet. This is effected by dies upon the periphery of the drum, which compresses it laterally when the punch $k$ is withdrawn. In this construction the groove in the drum is formed of semicircular cross-section, and segmental dies 97 are arranged to move laterally from the groove upon the periphery of the drum and are formed each with an inclined outer surface to be automatically pressed apart by the tobacco, which is forced through the inlet by the punch $k$, as shown in Fig. 22$^a$. Each of the dies is provided with two arms 98, projected through slots 99 in the shell of the drum and jointed by circular eyes $r^2$ upon a stud $r'$, held in the center of the drum. The slots 99 are made of sufficient width in the shell of the drum to admit the insertion of the eyes $r^2$, and the stud $r'$ is readily passed through the eyes when all the dies are grouped in their proper positions and the stud secured in the shaft of the drum, as shown in Fig. 22$^b$. The two dies at opposite sides of each groove are pressed together by an elastic band 77, as shown at the left side of Fig. 22$^a$, which may be applied to the arms when they are first inserted through the slots; but it is immaterial what kind of springs are used to hold the dies normally closed. With this construction the filler-rod is pressed upon the outer and inner surfaces by the bottom of the groove and the punch $k$ and upon its lateral edges by the dies 97, so that it is rounded by pressure upon all sides, and is thus shaped in the most perfect manner. To retract the dies from the filler-rod when the filler is in a line with the nozzle $j$, the bottom slide 121 is made only of sufficient thickness to wedge between the dies and force them slightly apart, which has the effect of pressing into the filler any shreds of tobacco which may have protruded beyond the opposed edges of the dies; but does not hold the filler with sufficient firmness to prevent its expulsion by the filler-punch. The filler-punch 120 is actuated by connection with a reciprocating bar 127, which is operated by the lever-arm 128 and a cam 129, and Fig. 17 shows the filler-punch forced through the groove in the drum to the point where the filler would be ejected.

*Appliances for engaging and trimming of cigarettes.*—In Figs. 13, 14, 15, 17, and 23 are shown so-called "locators" 130 and 131, adapted to set the shell with one end or the other about flush with the bushing in the carrier-disk, so that any tobacco projecting beyond the end of the shell may be trimmed by the rotary cutters 60 and 61. (Shown in Figs. 17 and 16.) The locators are fixed to a single shifting bar 138, which is actuated, as shown in Fig. 17, by a lever 143, vibrated by connection with a cam 144. (Shown in Fig. 17.) The carrier-disk after each movement is locked by a pawl 132, (shown in Fig. 13,) which is held in notches in the rim of the carrier-disk by a cam 133 upon the shaft $t$. Adjacent to this shaft is the stand $i$, carrying two bearings and a shaft 134, upon which two arms 135 are fixed at a suitable angle to one another to carry the trimming-cutters adjacent to the shell, where it receives the filler, and near the bottom of the dial. The arms 135 are oscillated together by an arm 136 and cam 137. The carrier-disk is omitted in Fig. 16, but its location is indicated by two dotted lines $c$, and the pawl 132 is shown, which lies directly beneath the dial. A gear-wheel 139$\frac{1}{2}$, attached to the shaft $t$, rotates a loose gear 95 upon the shaft 134 and other gears 96, connected with the cutters, so that they are in constant rotation. One of the arms 135, which carries the cutter 61, is shown in Fig. 16 provided with the train of gears which connect it with the shaft $t$; but the gears are omitted from the other arm to avoid obscuring the drawings, and both arms are shown with split hubs having clamp-screws, by which they may be adjusted and secured in the desired position upon their pivot-shaft 134. The cutters 60 and 61 stand, as shown in Fig. 16, at opposite sides of the carrier-disk and flush with the ends of the bushings $c'$, (shown in Fig. 17,) so as to make a clean cut of the tobacco.

*Means for locating the cigarettes for trimming.*—Where the shells are to be finished without mouthpieces, they are first introduced to the bushings in the carrier-disk in such position as to clear the nozzle $j$ when brought in front of the same. The locator 130 is then moved to push the shell upon the nozzle, where it is pinched by a pivot-jaw 140, (shown in Fig. 19,) and the locator then retires. The jaw is actuated by a lever 141 in the rear of the cam 142. (Shown in Fig. 17.) The cam 142 is not shown in Fig. 19, as it is in the rear of the cam 119. The jaw is pressed toward the nozzle $j$ by a spring 150 of sufficient strength (see Fig. 19) to hold the shell upon the nozzle while the tobacco rod is pushed therein. The lever 141 is pressed toward the cam by spring 148 and has a pin at its upper end in contact with the tail of the jaw 140, and the cam 142 is suitably operated to move the jaw away from the nozzle $j$ when the shell is filled with tobacco and trimmed. The carrier-disk $c$, by means of its adjusting-nut 30, is so set that the outer end of the shell is flush with the bushing in the carrier-disk when pushed upon the nozzle $j$, as shown in Fig. 17, and the bearings of the rotary cutters 60 and 61 are longitudinally adjustable in split boxes 139 upon the ends of the arms 135 to adapt them to such changes of position in the carrier-disk. The locator 130, which pushes the shell upon the nozzle, thus sets its outer end flush with the bushing in readiness to be trimmed.

*Process of filling and trimming the shells.*— While the shell is clamped upon the nozzle $j$ the filler-punch 120 is advanced nearly to the position shown in Fig. 17, thus forcing the filler into the shell and slightly beyond the outer end of the same to be trimmed. The locator 130 having been previously drawn back to the position shown in dotted lines in Fig. 17, the cutter-arms are moved and the outer end of the cigarette is trimmed by the cutter 60. The jaw 140 is then moved to release the shell, and the filler-punch is then advanced again sufficiently to push the cigarette from the nozzle and to set the inner end of the shell just within the inner end of the bushing upon the carrier-disk. Successive movements of the dial bring such shell opposite the other locator 131, which then operates upon the trimmed end of the shell to move it slightly forward, setting the shell flush with the inner end of the bush, after which it is trimmed by the cutter 61. An ejector 66 is shown in Figs. 1 and 15 operated in line with one of the bushings carrying the finished cigarette, and such ejector pushes the cigarette from the hole in the carrier-disk into the chute 62, which drops it through the bed 63 into a suitable receptacle. The ejector is actuated by lever 69 and a cam or shaft $u$. In place of a chute the cigarettes may be received by any suitable stacking apparatus, where they may be grouped together for subsequent packing.

*Filling Russian cigarettes.*—The Russian cigarette is provided with the coiled mouth-piece which displaces a certain proportion of the tobacco in the shell, and great difficulty has been heretofore experienced in filling such shells by machinery, as it was difficult to avoid a weakness in the shell adjacent to the mouthpiece. To avoid such defect in cigarettes made with the present mechanism, the mouthpiece is first inserted in the shell, as described above, and then carried by the dial-plate to the nozzle $j$. The locator 130 is suitably set to force the shell upon the nozzle, where it is clamped, and instead of retracting, as when filling ordinary shells to permit the trimming of the outer end, the locator is held against the mouthpiece to resist the pressure of crowding the tobacco against the same. While the clamp holds the shell firmly upon the jaw and the locator supports the mouthpiece the filler-punch is moved forward a suitable distance to press the tobacco filler firmly against the inner end of the mouthpiece. The locator 130 is then retracted and the filler-punch again advanced to strip the cigarette from the nozzle and to force the inner end of the shell slightly within the bushing. When the cigarette is advanced to a line with the second locator 131, such locator is advanced to contact with the mouthpiece and moves the cigarette slightly rearward to bring the rear end of the shell flush with the bushing, after which the tobacco projecting from the rear end is trimmed, as before described. The cigarettes are then completed and may be discharged from the carrier-disk.

From the above description it will be understood that all the operations of the machine are completely automatic from the delivery of the paper blanks to the discharge of the cigarettes from the dial-bushings. No cigarette-machine has heretofore made individual filler-rods for cigarettes by compressing the tobacco with horizontal and vertical slides and retaining-jaws, as shown herein, and such treatment of the tobacco forms a much more perfect filler-rod and gives to the cigarettes a uniformity of appearance and firmness of feeling which cannot be attained when the fillers are of unequal character.

Having thus set forth the nature of the invention, what is claimed herein is—

1. In a machine for making individual cigarettes, a magazine having a stock of the cut blanks supported therein, a pusher operated to move the stock of blanks forward, an arbor for winding the blanks, means for seaming the edges of the blanks, and a crimping-mandrel and a crimping-roll for crimping the edges of the seamed blanks without pasting the same, substantially as herein set forth.

2. In a machine for making individual cigarettes, a magazine containing the blanks set on edge with a pusher to move the blanks forward, a winding-arbor having vacuum-ports to draw one blank from the magazine and wind it, a crimping-mandrel in line with the arbor with seaming-tube 24 adapted to seam the blank and rolls to crimp the seam, and means to shift the winding-blank to the crimping-tools.

3. In a machine for making individual cigarettes, a magazine containing the blanks set on edge with a pusher to move the blanks forward, a winding-arbor having vacuum-ports to draw one blank from the magazine and wind it, a crimping-mandrel in line with the arbor with seaming-tube 24 adapted to seam the blank and rolls to crimp the seam, a shifter embracing the arbor to push the blank forward, and a semicircular former 24$^a$ to give a trough shape to the blank when wound by the arbor.

4. In a machine for making individual cigarettes, a magazine containing the blanks, a winding-arbor having vacuum-ports to draw one blank from the magazine and wind it, a crimping-mandrel in line with the arbor, a roll within the forward end of the mandrel, an adjacent roll adjustable to and from the mandrel, a former 24$^a$ sustained at the side of the arbor, and a shifter embracing the arbor and operated to push the wound blanks through the seaming and crimping tools.

5. In a machine for making individual cigarettes, a magazine containing the blanks, a winding-arbor having vacuum-ports to draw one blank from the magazine and wind it, a crimping-mandrel in line with the arbor, with a seaming-tube 24 to seam the blank and rolls to crimp the seam, a carrier-disk with transverse holes to receive the shells, means for adjusting the holes successively in line with the crimping-mandrel, means to force the shells from the winding and crimping device into the said holes, means for molding the tobacco filler, such means being provided with a nozzle, means to discharge the filler from the nozzle, and means for shifting the carrier-disk to bring the shells successively to such nozzle.

6. In a machine for making individual cigarettes, the combination, with means for molding the tobacco filler and having a nozzle as set forth to discharge the fillers to the shells, of the carrier-disk having transverse holes, means for supplying the cigarette-shells to the holes, means for shifting the carrier-disk to bring the shells successively in line with the nozzle, a locator for pushing the shells successively upon the nozzle, means operating to retract the locator after pushing each shell, and means for forcing the filler into the shell with its outer end projected beyond the shell sufficiently to be trimmed.

7. In a machine for making individual cigarettes, the combination, with means for molding the tobacco filler and having a nozzle as set forth to discharge the filler to the shells, of the carrier-disk having transverse holes, means for supplying the cigarette-shells to the holes, means for shifting the carrier-disk to bring the shells successively in line with the nozzle, a locator for pushing the shells successively upon the nozzle, means operating to retract the locator after pushing each shell, means for forcing the filler through the shell to project it beyond the end of the shell, means for trimming such projecting end of the filler while the shell is upon the nozzle, and means for again forcing the filler outward to discharge the shell and the filler from the nozzle.

8. In a machine for making individual cigarettes, the combination, with means for molding the tobacco filler and having a nozzle as set forth to discharge the filler to the shells, of the carrier-disk having transverse holes, means for supplying the cigarette-shells to the holes, means for shifting the carrier-disk to bring the shells successively in line with the nozzle, a locator for pushing the shells successively upon the nozzle, means operating to retract the locator after pushing each shell, means for forcing the filler through the shell with the filler projecting from both ends of the shell, means for trimming the outer end of the filler while the shell is upon the nozzle, means for again forcing the filler outward to discharge the shell and the filler from the nozzle, and means for shifting the carrier-disk past a cutter to trim the inner end of the filler.

9. In a machine for making individual cigarettes, the combination, with the carrier-disk having transverse holes, of means for supplying cigarette-shells to such holes, means to form the tobacco filler and insert the same in the shell, a cutter operating flush with the face of the carrier-disk, a locator for setting the end of the shell flush with the carrier-disk, and means for moving the cutter past the carrier-disk to trim the tobacco from the end of the shell.

10. In a machine for making individual cigarettes, the combination, with the carrier-disk having transverse holes, of means for supplying cigarette-shells to such holes, means to form the tobacco filler and insert the same in the shell, locators to set the ends of the filled shell alternately flush with the carrier-disk, and means operating flush with the carrier-disk for successively trimming the tobacco from such ends.

11. In a machine for making individual cigarettes, a filler-molding device embracing a drum with longitudinal peripheral grooves, a casing provided with inlet and outlet apertures, means for pressing a charge of tobacco through an inlet into one of the grooves, means for shifting such groove to the outlet, means for maintaining the compression of the tobacco in the groove, and means for discharging the filler longitudinally from the groove.

12. In a machine for making individual cigarettes, a filler-molding device embracing a drum with longitudinal peripheral grooves, a casing provided with inlet and outlet apertures, a shelf adjacent to the inlet-aperture, a tobacco-feeder above the shelf, a presser to crowd the tobacco toward the casing, a slide to compress the charge of tobacco upon the shelf, and a punch to crowd the charge through the inlet into one of the grooves, means to shift the drum to bring such groove to the outlet, and means for discharging the filler longitudinally from the grooves.

13. In a machine for making individual cigarettes, a filler-molding device embracing a drum with longitudinal peripheral grooves, a casing provided with inlet and outlet apertures, a shelf 111 adjacent to the inlet-aperture, a tobacco-feeder above the shelf, a punch $k$ movable through the inlet, a presser 108 to crowd the tobacco upon the shelf toward the casing, means for retracting the punch flush with the presser, a slide $h$ operating between the presser and casing to compact the tobacco, means for advancing the punch to force the charge through the inlet into one of the grooves, means for shifting such grooves to the outlet, and means for discharging the filler therefrom.

14. In a machine for making individual cigarettes, a filler-molding device embracing the drum having peripheral grooves, the casing provided with apertures forming an inlet and an outlet corresponding to the grooves, and discharge-nozzle upon the outlet-aperture, a shelf below the lateral or inlet aperture with vertical slide over the same, a punch movable through such inlet, a feeder for discharging tobacco upon the surface of the shelf, the presser 108 to crowd the tobacco upon the shelf toward the casing, means for retracting the punch flush with the presser, a slider 105 moving the presser and punch to compact the tobacco at the end of the punch, means for advancing the punch to force the charge through the inlet into one of the grooves, such punch and groove being shaped to form a cylindrical filler, means to shift the drum to bring the groove to the discharge-outlet, molding-jaws operating upon the drum over each groove to compress the filler, means for slightly retracting such jaws to release the filler, and means for discharging the filler from the groove.

15. In a machine for making individual cigarettes, a filler-molding device embracing a drum with longitudinal peripheral grooves, a casing provided with inlet and outlet apertures, means adjacent to the inlet for compacting a charge of tobacco laterally and vertically, and forcing it into the groove and simultaneously giving it a cylindrical shape, means for shifting the drum to bring the groove to the outlet, means for retaining the tobacco in cylindrical form in the groove, and means for discharging the tobacco from the groove.

16. In a machine for making individual cigarettes, a filler-molding device embracing a drum with longitudinal peripheral grooves, a casing provided with inlet and outlet apertures, means adjacent to the inlet for compacting a charge of tobacco laterally and vertically, and forcing it into the groove and simultaneously giving it a cylindrical shape, dies movable upon the drum adjacent to the groove and shaped to hold the tobacco in cylindrical form, means for shifting the drum to bring the groove to the outlet, means for slightly separating the dies, and a filler-punch to force the tobacco from the groove into the shell.

17. In a machine for making individual cigarettes, a filler-molding device embracing a drum with longitudinal peripheral grooves, a casing provided with inlet and outlet apertures, means adjacent to the inlet for compacting a charge of tobacco laterally and vertically, and forcing it into the groove and simultaneously giving it a cylindrical shape, segmental dies movable upon the drum at opposite sides of the groove, arms extended from each die to the center of the drum and pivoted upon a stud thereat, means for pressing the dies normally together, means for shifting the drum to bring the groove to the outlet, means for slightly separating the dies, and a filler-punch to force the tobacco from the groove into the shell.

18. In a machine for making individual cigarettes, the combination, with means for forming a cylindrical shell and inserting a mouthpiece therein, of the mouthpiece appliance comprising a winding-spindle with fork to engage the end of the blank, a bed extended laterally from the spindle with transverse and oblique cutters operated thereon, means for feeding a strip along such bed beneath the cutters, means for alternately operating the cutters, and for reversing the cut blank after each actuation of the oblique cutter.

19. In a machine for making individual cigarettes, the combination, with means for forming a cylindrical shell and inserting a mouthpiece therein, of the mouthpiece appliance comprising a winding-spindle with fork to engage the end of the blank, a bed extended laterally from the spindle with transverse and oblique cutters operated thereon, means for feeding the blank a distance exceeding its length past the oblique cutter, means for then operating the transverse cutter and rotating the spindle to wind the blank, means then operating for feeding the blank less than its own length, and for then operating the oblique cutter and reversing the blank to present its point to the winding-spindle, substantially as herein set forth.

20. In a machine for making individual cigarettes, the combination, with means for forming a cylindrical shell and inserting a mouthpiece therein, of the mouthpiece appliance comprising a winding-spindle with fork to engage the end of the blank, a bed extended laterally from the spindle with transverse and oblique cutters operated thereon, means between the transverse cutter and the winding-spindle for reversing the alternate blanks, feed-rolls for feeding the blank and geared to a ratchet-wheel having long and short teeth disposed as set forth, and means for actuating the ratchet, the cutters, and the winding-spindle successively, substantially as herein set forth.

21. In a machine for making individual cigarettes, the combination, with means for forming a cylindrical shell and sustaining it to receive a mouthpiece, of a mouthpiece winding-spindle with a stripping-sleeve fitted movably upon its shank, a guide-tube embracing the point of the spindle for receiving the coiled mouthpieces, means for cutting blanks with acute points and advancing them to the spindle, and the spindle and guide-tube being slotted to admit the point of the blank, means for advancing the stripper to force the coiled blank from the spindle within the guide-tube, and means for advancing the mouthpieces within the guide-tube to discharge them to the cigarette-shells.

22. In a machine for making individual cigarettes, the combination, with means for forming a cylindrical shell and sustaining it to receive a mouthpiece, of a mouthpiece winding-spindle with a stripping-sleeve fitted movably upon its shank, a guide-tube embracing the point of the spindle for receiving the coiled mouthpieces, means for reciprocating the spindle within the guide-tube to embrace the blank, means for cutting blanks with acute points and advancing them to the spindle, and the spindle and guide-tube being slotted laterally to admit the point of the blank, means for advancing the stripper to force the coiled blank from the spindle within the guide-tube, and means for discharging the mouthpieces successively from the guide-tube.

23. In a machine for making individual cigarettes, the combination, with means for forming a cylindrical shell and sustaining it to receive a mouthpiece, of a mouthpiece winding-spindle with a stripping-sleeve fitted movably upon its shank, a guide-tube embracing the point of the spindle for receiving the coiled mouthpieces, and slotted upon one side for the passage of fingers, means for feeding blanks to such spindle, means for advancing the stripper to discharge the mouthpieces when coiled from the spindle, and a finger-plate having lateral and longitudinal movements with fingers inserted successively behind such mouthpieces for moving them forward into the shells, substantially as herein set forth.

24. In a machine for making individual cigarettes, the winding-spindle $e$ with fork to engage the end of the blank, a guide-tube embracing the end of the spindle and slotted to admit the blank, means for feeding the blank transversely to such spindle, means for advancing the fork of the spindle upon the point of the blank, means for rotating the spindle to wind the blank, means for reversing the rotation of the spindle to free the blank, and a stripping-sleeve fitted to the shank of the spindle and actuated, upon such reversal of the spindle, to strip the finished mouthpiece from the spindle, substantially as herein set forth.

25. In a machine for making individual cigarettes, the means for making the mouthpieces, comprising the mouthpiece winding-spindle $e$ splined to the gear 47, the gear-segment 58 with connection to crank-pin 59 for reversibly rotating the gear 47, means for feeding a blank to such spindle, and lever and cam with connections to the winding-spindle for advancing the spindle upon the point of the blank, and the stripping-sleeve $e'$ with means for reciprocating the same at the close of the winding operation to strip the mouthpieces from the spindle.

26. In a machine for making individual cigarettes, the means for making the mouthpieces comprising mouthpiece winding-spindle $e$ with the stripping-sleeve $e'$ fitted movably upon its shank, the guide-tube $d$ embracing the point of the spindle for receiving the coiled mouthpieces and slotted upon one side for the passage of fingers, means for feeding blanks to such spindle, the slide 51 with connection to the stripping-sleeve $e'$, the finger-plate 54 having slot-and-pin connection to the slide 51 and fingers 57 movable within the guide-tube $d$, and means for reciprocating the slide 51 at the close of the winding operation to strip the mouthpieces successively from the winding-spindle and force them into the shells.

27. In a machine for making individual cigarettes, the combination, with a winding-spindle having a fork to engage the end of the blank, a bed extended laterally from the spindle with transverse and oblique cutters thereon, means for feeding a strip to the cutters and operated first to feed the strip a distance exceeding the length of one blank past the oblique cutter, means for then operating the transverse cutter and rotating the spindle to wind the blank, and means then operating for feeding the strip less than the length of one blank and for then operating the oblique cutter, of the reversing-disk arranged between the transverse cutter and the winding-spindle, and provided with a presser to grip the blank, and means for rotating the reversing-disk to reverse the blank and for lifting the presser to disengage the strip, substantially as herein set forth.

28. In a machine for making individual cigarettes, the combination, with means for forming the shells and delivering them to a carrier-disk $c$, of the filler-molding device embracing the drum 100 having peripheral grooves, the casing $g$ provided with outlet-nozzle $j$, means for forming the fillers in the grooves and discharging them from the nozzle, the carrier-disk $c$ intermediate to the shell-forming device and the filler-molding device, and provided with ratchet mechanism for turning the dial-plate intermittently and gearing connecting the dial-plate and the grooved molding-drum to turn the drum intermittently to bring the grooves successively in line with the nozzle $j$ and holes in the dial-plate.

29. In a machine for making individual cigarettes, the means for trimming the cigarettes consisting of a carrier, as the carrier-disk $c$, with transverse holes to carry the shells with their contained fillers, two locators adapted to set the shells longitudinally in the holes in the carrier-disk, the revolving cutters 60 and 61 supported upon the arms 135 attached to the shaft 134, and means for actuating the carrier, the locators and the arms for the cutters at intervals to trim the opposite ends of the cigarettes successively.

30. In a machine for making individual cigarettes, the cutting mechanism for trimming the opposite ends of the cigarettes, comprising the two arms 135, the shaft 134 attached to the arms, and oscillated by the arm 136 and cam 137, the cutters 60 and 61 mounted in bearings upon the outer ends of the arms, and the gears $139\frac{1}{2}$, 95 and 96 for rotating the cutters, the whole arranged to operate successively upon the opposite ends of the cigarettes, substantially as herein set forth.

31. In a machine for making individual cigarettes, the combination, with means for molding the tobacco filler and having a nozzle as set forth to discharge the fillers to the shells, of the carrier-disk having transverse holes, means for supplying the cigarette-shells to the holes, and means for adjusting the carrier-disk axially to and from the nozzle to vary the relation of the shells to the dial-plate when fitted to the nozzle.

32. In a machine for making individual cigarettes, the combination, with means for molding the tobacco filler and having a nozzle as set forth to discharge the fillers to the shells, of the carrier-disk having bushings to receive the cigarette-shells, means for supplying the cigarette-shells to the bushings, means for shifting the carrier-disk to bring the shells successively in line with the nozzle, a locator for pushing the shells successively upon the nozzle, means for adjusting the carrier-disk axially to and from the nozzle to set the outer end of the bushing flush with the outer end of the shell when the shell is upon the nozzle, whereby the filler may be protruded through the shell and bushing and trimmed while held upon the nozzle.

33. In a machine for making individual cigarettes, the combination, with means for molding the tobacco filler and having a nozzle as set forth to discharge the fillers to the shells, of the carrier-disk having bushings to receive the cigarette-shells, means for supplying the cigarette-shells to the bushings, means for shifting the carrier-disk to bring the shells successively in line with the nozzle, a locator for pushing the shells successively upon the nozzle, means for adjusting the carrier-disk axially to and from the nozzle to set the outer end of the bushing flush with the outer end of the shell when the shell is upon the nozzle, a cutter movable transverse to the bushing to trim the filler, and means for adjusting the cutter to move close to the end of the bushing, substantially as herein set forth.

In testimony whereof I have hereunto set my hand in the presence of two subscribing witnesses.

FRANK J. LUDINGTON.

Witnesses:
THOMAS S. CRANE,
L. LEE.